United States Patent
Lee et al.

(10) Patent No.: US 7,606,877 B2
(45) Date of Patent: Oct. 20, 2009

(54) METHOD AND SYSTEM FOR DETAILED ACCOUNTING OF PACKET DATA

(75) Inventors: Ji-Woong Lee, Seoul (KR); Un-Hae Choi, Seoul (KR); Dong-Gi Yang, Seoul (KR); Byung-Cheol Choi, Seoul (KR)

(73) Assignee: KT Corporation, Seongnam-si (KR)

( * ) Notice: Subject to any disclaimer, the term of this patent is extended or adjusted under 35 U.S.C. 154(b) by 556 days.

(21) Appl. No.: 11/269,279

(22) Filed: Nov. 8, 2005

(65) Prior Publication Data

US 2006/0056415 A1 Mar. 16, 2006

Related U.S. Application Data

(63) Continuation of application No. PCT/KR2005/000649, filed on Mar. 9, 2005.

(30) Foreign Application Priority Data

| | | | |
|---|---|---|---|
| Mar. 9, 2004 | (KR) | | 10-2004-0015705 |
| Apr. 21, 2004 | (KR) | | 10-2004-0027336 |
| Apr. 21, 2004 | (KR) | | 10-2004-0027337 |

(51) Int. Cl.
*G06F 15/16* (2006.01)
*H04L 12/28* (2006.01)
*H04L 12/56* (2006.01)
*H04M 15/00* (2006.01)

(52) U.S. Cl. ............... 709/219; 370/392; 370/402; 379/114.03

(58) Field of Classification Search ............... 709/219
See application file for complete search history.

(56) References Cited

U.S. PATENT DOCUMENTS

| | | | | |
|---|---|---|---|---|
| 7,025,209 | B2 * | 4/2006 | Hawkins | 209/217 |
| 7,171,460 | B2 * | 1/2007 | Kalavade et al. | 709/223 |
| 7,209,473 | B1 * | 4/2007 | Mohaban et al. | 370/352 |
| 2002/0176378 | A1 * | 11/2002 | Hamilton et al. | 370/328 |
| 2003/0233329 | A1 | 12/2003 | Laraki et al. | |
| 2004/0009761 | A1 | 1/2004 | Money et al. | |
| 2004/0019539 | A1 | 1/2004 | Raman et al. | |
| 2004/0028055 | A1 | 2/2004 | Madour et al. | |
| 2004/0148384 | A1 | 7/2004 | Ramakrishnan et al. | |
| 2004/0205165 | A1 * | 10/2004 | Melamed et al. | 709/219 |

* cited by examiner

*Primary Examiner*—George C Neurauter, Jr.
*Assistant Examiner*—Mark D Fearer
(74) *Attorney, Agent, or Firm*—Knobbe Martens Olson & Bear LLP

(57) ABSTRACT

A method and apparatus for detailed accounting of packet data are disclosed. According to one embodiment of the present invention, on receiving a duplicated HTTP request from a packet duplication apparatus, a billing apparatus extracts an access address to generate a first hash value. Then, on receiving a converted HTTP response from the packet duplication apparatus, the billing apparatus extracts a second hash value from the duplicated HTTP response to compare with the first hash value. If the first hash value and the second hash value are the same, the billing apparatus sets the HTTP REQUEST and the converted HTTP response as a transaction to generate billing data. Thus, the billing apparatus can generate accurate billing data.

14 Claims, 10 Drawing Sheets

METHOD AND SYSTEM FOR DETAILED ACCOUNTING OF PACKET DATA

RELATED APPLICATIONS

This application is a continuation application, and claims the benefit under 35 U.S.C. §§ 120 and 365 of PCT Application No. PCT/KR2005/000649, filed on Mar. 9, 2005 and published on Sep. 15, 2005, in English, which is hereby incorporated by reference.

BACKGROUND OF THE INVENTION

1. Field of the Invention

The present invention relates to method and system for detailed accounting of packet data, more particularly, a method and system for detailed accounting of packet data for use of mobile data services.

2. Description of the Related Technology

Recently, it is possible to transceive a voice signal and a high-speed data in a mobile terminal due to wireless communication technology such as code division multiple access (CDMA).

A user can receive data via a packet network, and a mobile communication service provider generates billing data at every time of using a packet network (use of mobile data services) for service charges and manages generated billing data. Total service charges corresponding to each data service use and voice service use are calculated by aggregating the generated billing data at a predetermined period of time (e.g., monthly).

Thus, to make a reliable service charge to a user, the mobile communication service is presenting ways for guaranteeing the transparency of service charges.

The following is a conventional method of generating billing data for use of mobile data services.

First, in order to receive a content data from a content server, a user sends a data request to a packet data serving node (PDSN) where the mobile terminal accesses.

The PDSN sends the data request to one of proxy servers corresponding to the service platform of the mobile terminal (e.g., binary runtime environment for wireless (BREW), mobile explorer (ME), KTF unified navigator (KUN), wireless Internet platform for interoperability (WIPI) and video on demand (VOD), etc,.). In sending the data request to the proxy server, a billing apparatus calculates a network usage charge corresponding to the data request.

The proxy server sends the data request to a corresponding content server and receives content data from the content server and transmits it to the PDSN. Also, the billing apparatus calculates a content usage charge and network usage charge in this process.

The PDSN sends received content data to the mobile terminal, and the billing apparatus sums up the network usage charges and/or content usage charges to generate a combined billing data or to perform a billing process.

In the conventional method of generating billing data as described above, the billing apparatus generates the billing data at every time of transmitting a packet data (e.g., data request, content data) between the PDSN and the proxy server.

Namely, when a user requests content transmission to the content server by a hyper text transfer protocol (HTTP) protocol via a wired/wireless Internet and/or other network, the billing for the content transmission (i.e., network usage charges, content usage charges) is performed before checking whether or not the mobile terminal receives requested content data.

This method of generating billing data is based on the assumption that the network and the content server operate in an ideal communication environment. Thus, instability of the network and malfunction of the content server can cause billing errors.

That is, since the conventional method generates billing data by analyzing a TCP/IP protocol only, it is impossible to generate billing data commensurate with the use history of mobile data services of a user. Furthermore, even if a HTTP protocol analysis is performed, it is also impossible to generate an accurate billing data because the conventional method generates billing data based on an assumption that there must exist a pair of HTTP request and HTTP response, i.e., transaction.

Also, the conventional method generates billing data, even if the user does not receive any data (e.g., communication error, data absence, etc), only because there is a HTTP request.

Also, it is difficult to recognize the transaction by locating a network analyzer for a network packet between the mobile terminal and the proxy server in the conventional method.

Also, there is a problem that the conventional method generates an Internet protocol detail record (IPDR) based on the amount of used time and used packet for a whole data session when generating billing data such as an IPDR or call detail record (CDR)). Namely, an IPDR for individual services used in the same data session is not generated.

Also, there is another problem that the conventional method cannot generate an accurate IPDR when a repeated transaction, an unfinished transaction or unfinished session happens.

SUMMARY OF CERTAIN INVENTIVE ASPECTS

One aspect of the invention provides a method and system for detailed accounting of packet data, which generates billing data after finishing transmission of content data so that reliable billing data can be generated.

Another aspect of the present invention provides a method and system for detailed accounting of packet data, which can check if data transmission is completed normally by analyzing packet transmitted between a mobile terminal and a content server.

Another aspect of the present invention provides a method and system for detailed accounting of packet data, which can prevent an occurrence of the billing error.

Another aspect of the present invention provides a method and system for detailed accounting of packet data, which share Hash function in mobile communication service system to recognize transaction easily.

Another aspect of the present invention provides a method and system for detailed accounting of packet data, which can provide the detailed and rigid billing for Internet service and content through the transaction recognition.

Another aspect of the present invention provides a method and system for detailed accounting of packet data, which can recognize transaction based on network packet or HTTP message in communicating HTTP request message and HTTP Response message between the mobile terminal and the proxy server by using persistent connection.

Another aspect of the present invention provides a method and system for detailed accounting of packet data, which can perform detailed accounting for each service by generating IPDR combining time billing data and packet billing data of each service being used in same session.

Another aspect of the present invention provides a method and system for detailed accounting of packet data, which can generate accurate IPDR even if repeated transaction, unfinished transaction or unfinished session happens.

Another aspect of the present invention provides a method and system for detailed accounting of packet data, which can distinguish packet transmission time and idle time in same data session and apply a separate billing policy to the idle time.

Still another aspect of the present invention provides a method of determining a billing time for a billing apparatus to generate billing data for using a mobile data service, comprising: i) acquiring an ACK number (Acknowledgement number) included a HTTP Response that corresponds to the HTTP Request and is transmitted from the content server to the user terminal as a first parameter, ii) acquiring a content-length field value included in the HTTP Response as a second parameter, iii) acquiring a header length that is calculated from a TCP payload of a first packet of the HTTP Response as a fourth parameter, iv) acquiring an ACK number included in an ACK message that corresponds to the HTTP Response and is transmitted from the user terminal to the content server as a fourth parameter, v) determining whether or not the fourth parameter is not less than a fifth parameter that is a sum of the first parameter, the second parameter and the third parameter, and vi) generating billing data if the fourth parameter is not less than the fifth parameter.

In one embodiment, a generation of billing data is deferred until a new ACK message including the fifth parameter equal to or larger than the sixth parameter is transmitted from the user terminal to the content server if the fifth parameter is less than the sixth parameter. In one embodiment, the HTTP Request and the HTTP Response are TCP packet data.

In one embodiment, the header length is generated by calculating octet size from the start of TCP payload of the first packet of HTTP Response to the first blank line. In one embodiment, the blank line comprises only CRLF in one line In one embodiment, the first parameter is a serial number indicating the first octet of the HTTP Request, wherein the second parameter is a serial number indicating the first octet of the HTTP Response. In one embodiment, the billing apparatus is located on a transmission line between the user terminal and the content server, wherein the HTTP Request and the HTTP Response transceived through the billing apparatus.

In one embodiment, the billing apparatus receives duplicated data corresponding to the HTTP Request and the HTTP Response from a packet duplication apparatus locating on a transmission line between the user terminal and the content server.

Still another aspect of the present invention provides a method of determining a billing time for a billing apparatus to generate billing data for using mobile data service, comprising: i) acquiring an ACK number (Acknowledgement number) included a HTTP Response that corresponds to the HTTP Request and is transmitted from the content server to the user terminal as a first parameter, a content-length field value included in the HTTP Response as a second parameter, a header length that is calculated from a TCP payload of a first packet of the HTTP Response as a third parameter, iii) acquiring an ACK number included in an ACK message that corresponds to the HTTP Response and is transmitted from the user terminal to the content server as a fourth parameter, iv) determining whether or not the fourth parameter is not less than a fifth parameter that is a sum of the first parameter, the second parameter and the third parameter, and v) generating billing data if the fourth parameter is not less than the fifth parameter.

Still another aspect of the present invention provides a method of recognizing a transaction for billing apparatus, comprising: i) receiving a duplicated HTTP Request from a packet duplication apparatus, wherein the duplicated HTTP Request is duplication data of a HTTP Request being transmitted from a user terminal to a proxy server via the packet duplication apparatus and is duplicated by the packet duplication apparatus, ii) extracting an access address from the duplicated HTTP Request, iii) generating a first hash value by using the access address and a predetermined Hash function, iv) receiving a duplicated HTTP Response from the packet duplication apparatus, wherein the duplicated HTTP Response is duplication data of a converted HTTP Response being transmitted from a content server to the user terminal via the packet duplication apparatus and is duplicated by the packet duplication apparatus, v) extracting a second hash value from the duplicated HTTP Response, vi) comparing the first hash value with the second hash value, and vii) setting the HTTP Request and the converted HTTP Response as a transaction if the first hash value is identical with the second hash value, wherein the transaction is a pair of the HTTP Request and the converted HTTP Response.

In one embodiment, in order to generate the converted HTTP Response including the second hash value the proxy server performs: receiving the HTTP Request, generating the second hash value by using the access address and the predetermined hash function, transmitting the HTTP Request to the content server corresponding to the access address, receiving an original HTTP Response corresponding to the HTTP Request from the content server, and generating the converted HTTP Response by inserting the second hash value into a header of the original HTTP Response. In one embodiment, the access address is URL (Uniform Resource Locator).

In one embodiment, the converted HTTP Response is transmitted to the user terminal via a data service apparatus, wherein the data service apparatus is one of the following: an IWF (InterWorking Function), a PDSN (Packet Data Serving Node), a SGSN(Serving GPRS Supporting Node), and a GPRS (Gateway GPRS Supporting Node).

Still another aspect of the present invention provides a method of recognizing a transaction for billing apparatus, comprising: i) receiving a HTTP Request from a data service apparatus, ii) extracting an access address from the HTTP Request, iii) generating a first hash value by using the access address and a predetermined Hash function, iv) transmitting the HTTP Request to a proxy server, v) receiving a converted HTTP Response from the proxy server, wherein the converted HTTP Response comprises a second hash value and an original HTTP Response corresponding to the HTTP Request, vi) extracting the second hash value from the converted HTTP Response, vii) comparing the first hash value with the second hash value, viii) setting the HTTP Request and the converted HTTP Response as a transaction if the first hash value is identical with the second hash value, wherein the transaction is a pair of the HTTP Request and the converted HTTP Response, and ix) transmitting the converted HTTP Response to the data service apparatus.

In one embodiment, in order to generate the converted HTTP Response the proxy server performs: receiving the HTTP Request, generating the second hash value by using the access address and the predetermined hash function, transmitting the HTTP Request to the content server corresponding to the access address, receiving the original HTTP Response corresponding to the HTTP Request from the content server, and generating the converted HTTP Response by inserting the second hash value into a header of the original HTTP Response.

Still another aspect of the present invention provides a method for generating a combined billing data by service group at a billing apparatus for using a mobile data service when TCP session is connected between a user terminal and a proxy server, comprising: (a) recognizing a transaction by use of packet data transceived between a data service apparatus and a proxy server, wherein the transaction is a pair of a HTTP Request and a HTTP Response corresponding to the HTTP Request, (b) generating a basic IPDR (Internet Protocol Detail Record) by transaction, wherein the basic IPDR comprises a start time and an end time of the transaction, an amount of packet data, and an access address, repeating the (a) and (b) until the end of TCP session between the user terminal and the proxy server, generating a combined IPDR from aggregating a plurality of basic IPDRs by service group corresponding to the access address.

In one embodiment, the generating combined IPDR comprises: recognizing an end of TCP session, (c) checking an end error in one of transactions by using the basic IPDR, (d) redefining the start time or the end time of the transaction if there exists the end error, (e) classifying the basic IPDR into one of predetermined service groups based on the access address included in the basic IPDR, repeating the (c) to (e) to all basic IPDRs generated during the connection of TCP session, and generating the combined IPDR from aggregating a service use time by service group, wherein the aggregated service use time is a sum of differences between the end time and the start time of transactions in the service group.

In one embodiment, the end error is either a first error in which an end of transaction is not recognized or a second error in which when plural transactions occur during one TCP session connection, the end time of preceding transaction occurs after the start time of following transaction.

In one embodiment, the redefining the start time or the end time of the transaction if there exists the end error is to set the end time of preceding transaction equal to the start time of following transaction.

In one embodiment, the billing apparatus performs the (a) and the (b) by use of the packet data if the data service apparatus, the billing apparatus and the proxy server are located on a transmission line of the packet data.

In one embodiment, the billing apparatus performs the (a) and the (b) by use of the packet data being duplicated by the packet duplication apparatus if the data service apparatus, the packet duplication apparatus and the proxy server are located on a transmission line of packet data and the packet duplication apparatus and the billing apparatus are coupled each other independently. In one embodiment, the access address is URL (Uniform Resource Locator).

In one embodiment, the method for generating a combined billing data by service group further comprises the steps of: calculating a total service use time of the user terminal during the TCP session connection, calculating a connection time of the TCP session, calculating an idle time by subtracting the total service time from the connection time of TCP session, and billing the service use time and the idle time, respectively.

In one embodiment, the calculating a connection time of the TCP session is calculating the connection time of TCP session by subtracting a start time of TCP session from an end time of TCP session if the end time of TCP session is recognized, calculating the connection time of TCP session by subtracting the start time of TCP session from an end time of PPP connection if the end of TCP session is not recognized but the end time of PPP connection is recognized, calculating the connection time of TCP session by subtracting the start time of TCP session from an end time of final transaction of the TCP session connection if the end time of TCP session connection and the end time of PPP connection are not recognized.

In one embodiment, the data service apparatus is one of the following: IWF (InterWorking Function), PDSN (Packet Data Serving Node), SGSN(Serving GPRS Supporting Node), and GPRS (Gateway GPRS Supporting Node).

Still another aspect of the present invention provides a billing apparatus for determining a billing time to generate billing data for using mobile data service, comprising: i) a parameter collector for acquiring a sequence number included in a HTTP Request that is transmitted from a user terminal to a content server as a first parameter, an ACK number (Acknowledgement number) included a HTTP Response that corresponds to the HTTP Request and is transmitted from the content server to the user terminal as a second parameter, a content-length field value included in the HTTP Response as a third parameter, a header length that is calculated from a TCP payload of a first packet of the HTTP Response as a fourth parameter, and an ACK number included in an ACK message that corresponds to the HTTP Response and is transmitted from the user terminal to the content server as a fifth parameter, ii) a header-length calculator for generating the header length of the HTTP Response, iii) a comparator for determining whether or not the fifth parameter is not less than a sixth parameter that is a sum of the first parameter, the second parameter, the third parameter and the fourth parameter, and iv) a billing data generator for generating the billing data if the fifth parameter is not less than the sixth parameter.

In one embodiment, the billing apparatus is located on a transmission of packet data between the user terminal and the content server, wherein the HTTP Request and the HTTP Response transceived through the billing apparatus.

In one embodiment, the billing apparatus receives a duplicated data corresponding to the HTTP Request and the HTTP Response from a packet duplication apparatus locating on a transmission line between the user terminal and the content server.

Yet another aspect of the present invention provides a billing apparatus to recognize a pair of packet data transceived between a user terminal and a content server, comprising: i) means for receiving a duplicated HTTP Request and a duplicated HTTP Response from a packet duplication apparatus, wherein the duplicated HTTP Request is duplication data of a HTTP Request being transmitted from the user terminal to a proxy server via the packet duplication apparatus and the duplicated HTTP Response is duplication data of a HTTP Response being transmitted from the content server corresponding to an access address to the user terminal via the packet duplication apparatus, and the HTTP Request and the HTTP Response are duplicated by the packet duplication apparatus, ii) means for extracting the access address from the duplicated HTTP Request, iii) means for generating a first hash value by using the access address and a predetermined Hash function, iv) means for extracting a second hash value from the duplicated HTTP Response, v) means for comparing the first hash value with the second hash value, and vi) means for setting the HTTP Request and the converted HTTP Response as the transaction if the first hash value is identical with the second hash value, wherein the transaction is a pair of the HTTP Request and the converted HTTP Response, wherein in order to generate the converted HTTP Response including the second hash value the proxy server performs: receiving the HTTP Request, generating the second hash value by using the access address and the predetermined hash function, transmitting the HTTP Request to the content server corresponding to the access address, receiving an original HTTP Response corresponding to the HTTP Request from the content server, and generating the converted HTTP Response by inserting the second hash value into a header of the original HTTP Response.

Yet another aspect of the present invention provides a billing apparatus to recognize a pair of packet data transceived between a user terminal and a content server, comprising: i) means for receiving a HTIP Request from a data service apparatus and a converted HTTP Response from the proxy server, ii) means for extracting an access address from the HTTP Request, iii) means for generating a first hash value by using the access address and a predetermined Hash function, iv) means for extracting a second hash value from the converted HTTP Response, v) means for comparing the first hash value with the second hash value, vi) means for setting the HTTP Request and the converted HTTP Response as a transaction if the first hash value is identical with the second hash value, wherein the transaction is a pair of the HTTP Request and the converted HTTP Response, and vii) means for transmitting the HTTP Request to a proxy server and the converted HTTP Response to the data service apparatus, wherein in order to generate the converted HTTP Response including the second hash value the proxy server performs: receiving the HTTP Request, generating the second hash value by using the access address and the predetermined hash function, transmitting the HTTP Request to the content server corresponding to the access address, receiving an original HTTP Response corresponding to the HTTP Request from the content server, and generating the converted HTTP Response by inserting the second hash value into a header of the original HTTP Response.

Yet another aspect of the present invention provides a billing apparatus for generating billing data for using a mobile data service during TCP session connection between a user terminal and a proxy server, comprising: a recognizing part for recognizing a transaction by use of packet data transceived between a data service apparatus and a proxy server, wherein the transaction is a pair of a HTTP Request and a HTTP Response corresponding to the HTTP Request, a basic IPDR generating part for generating a basic IPDR (Internet Protocol Detail Record) by transaction, wherein the basic IPDR comprises a start time and an end time of the transaction, an amount of packet data, and an access address, and a combined IPDR generating part for generating a combined IPDR from aggregating a plurality of basic IPDRs by service group corresponding to the access address.

In one embodiment, the combined IPDR generating part comprises: a session manager for recognizing an end of TCP session, a checking part for checking if there is an end error in one of transactions by using the basic IPDR, an error correcting part for redefining the start time or the end time of the transaction if there exists the end error, a transaction classifying part for classifying the basic IPDR into one of predetermined service groups based on the access address included in the basic IPDR, and a use time aggregating part for generating the combined IPDR from aggregating service use times by service group, wherein the aggregated service use time is a sum of differences between the end time and the start time of transactions in the service group.

In one embodiment, the billing apparatus further comprises an idle time calculating part for generating an idle time by subtracting a total service use time from a connection time of TCP session.

In one embodiment, if the end error is either a first error that an end of transaction is not recognized or a second error that when plural transactions occur during one TCP session connection, the end time of preceding transaction occurs after the start time of following transaction, the error correcting part sets the end time of the transaction equal to the start time of following transaction.

Yet another aspect of the present invention provides a computer-readable medium including a program containing computer-executable instructions for performing the method for generating a combined billing data by service group at a billing apparatus, comprising: (a) recognizing a transaction by use of packet data being transmitted between a data service apparatus and a proxy server, wherein the transaction is a pair of a HTTP Request and a HTTP Response corresponding to the HTTP Request, (b) generating a basic IPDR (Internet Protocol Detail Record) by transaction, wherein the basic IPDR comprises a start time and an end time of the transaction, an amount of packet data, and an access address, repeating the (a) and (b) until the end of TCP session between the user terminal and the proxy server, generating a combined IPDR from aggregating a plurality of basic IPDRs by service group corresponding to the access address, recognizing an end of TCP session, (c) checking an end error in one of transactions by using the basic IPDR, (d) redefining the start time or the end time of the transaction if there exists the end error, (e) classifying the basic IPDR into one of predetermined service groups based on the access address included in the basic IPDR, repeating the (c) to (e) to all basic IPDRs generated during the connection of TCP session, and generating the combined IPDR from aggregating service use times by service group, wherein the aggregated service use time is a sum of differences between the end time and the start time of transactions in the service group.

DETAILED DESCRIPTION OF CERTAIN INVENTIVE EMBODIMENTS

Embodiments of the present invention will be described with accompanying drawings. Throughout the whole drawings, same reference numbers will be used to refer to the same elements.

Figure 1:
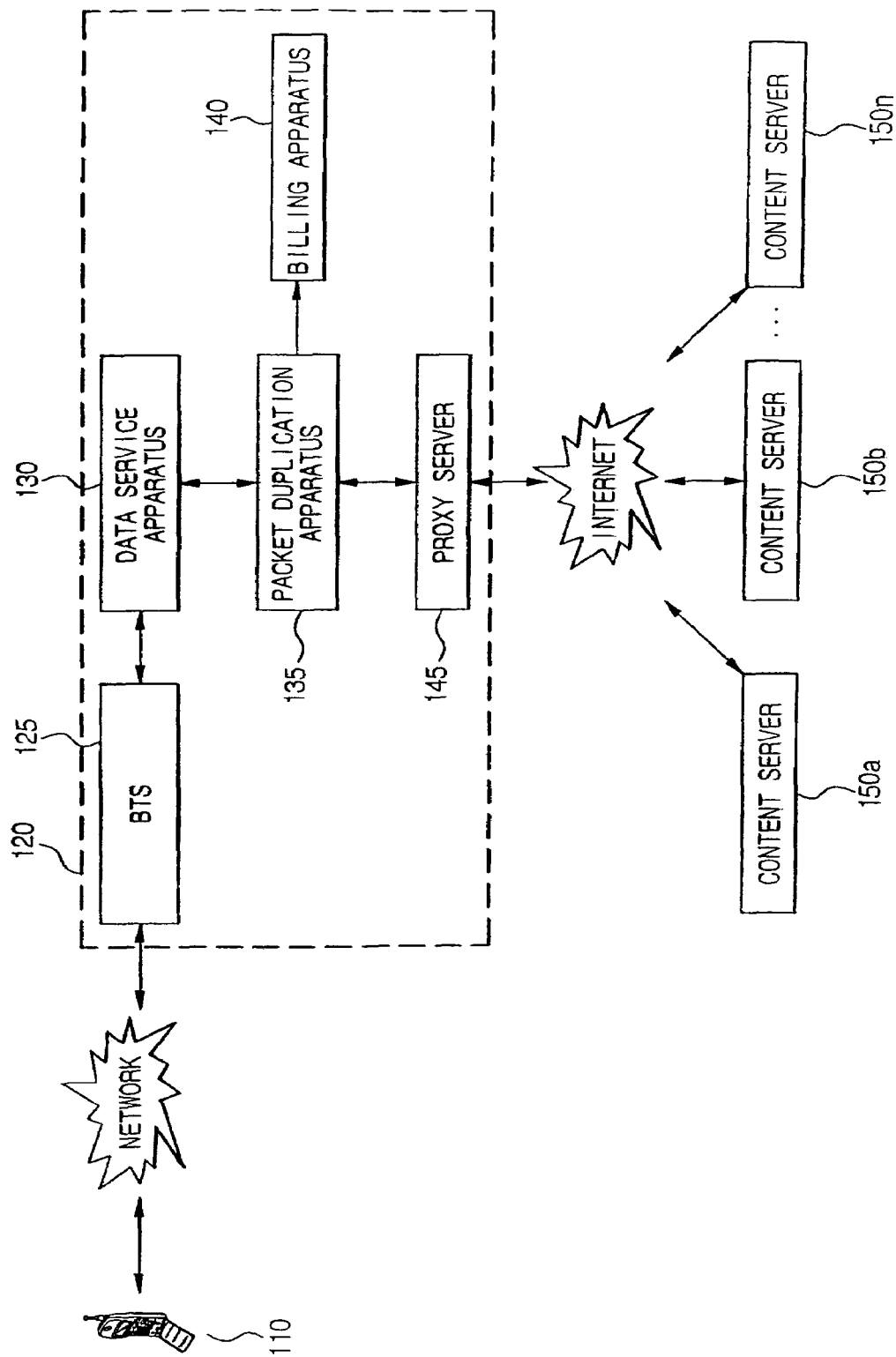
FIG. 1 is a block diagram of mobile communication service system according to one embodiment of the present invention.

FIG. 1 is a block diagram of mobile communication service system according to one embodiment of the present invention.

Referring to FIG. 1, a mobile communication service system 120 comprises a BTS (Base Transceiver Station) 125, a data service apparatus 130, a packet duplication apparatus 135, a billing apparatus 140, and a proxy server 145. Although not shown in FIG. 1, the mobile communication service system 120 can further comprise a BSC (Base Station Controller), a MSC (Mobile Switching Center), a HLR (Home Location Register), a VLR (Visitor Location Register), etc,.

The BTS 125 enables a mobile communication between the user terminal 110 and the mobile communication service system 120 via a mobile network, and communicates signals with the data service apparatus 130 on a transmission line. The user terminal 110 accesses to the mobile communication service system 120 via a mobile network, receives content data (e.g., ring sound, wallpaper, moving picture, etc.) from several content servers (150a, 150b, . . . , 150n: hereinafter, referred as '150') being coupled to the mobile communication service system 120. The user terminal 110 is, for example, one of mobile terminal, PDA (Personal Digital Assistant), notebook computer, etc.

The data service apparatus 130 enables the use of mobile Internet service, and is, for example, one of IWF (InterWorking Function), PDSN (Packet Data Serving Node), SGSN (Serving GPRS Supporting Node), and GPRS (Gateway GPRS Supporting Node). IWF is the mobile data service apparatus used in 2G network, PDSN is the mobile data service apparatus in synchronous 3G network, and GPRS is the mobile data service apparatus in asynchronous 3G network. Of course, it is apparent that any apparatus having same function described above will be used in embodiments of the present invention.

The packet duplication apparatus 135 duplicates all kinds of packet data being transceived between the data service apparatus 130 and the proxy server 145 to deliver duplicated packet data to the billing apparatus 140.

The billing apparatus 140 determines whether or not the transmission of content according to the user's request is normally completed (e.g., HTTP Response corresponding to HTTP Request is transmitted to the user terminal 110) by using packet data from the packet duplication apparatus 135, and in case of normal transmission, generates billing data corresponding to the use of mobile data service and performs billing.

The billing apparatus 140 comprises an analyzing part for checking if content data transmission is normally completed and a billing part for generating billing data and for performing billing.

The billing apparatus 140 recognizes the transaction (a pair of HTTP Request/Response) for determining the normal completion of content data transmission. Hash function can be used for recognizing transaction. The way of recognizing transaction by using Hash function in the billing apparatus 140 will be described with accompanying drawing.

Also, the billing apparatus 140 generates basic IPDR for each transaction by using packet data received from the packet duplication apparatus 135, and aggregates basic IPDRs according to the predetermined rule (e.g., by service type) to generate combined IPDR. The billing apparatus 140 performs billing by using the basic IPDR and/or combined IPDR.

The proxy server 145 consists of plural servers corresponding to service platforms of the user terminal 110 (e.g., BREW, ME, KUN, WIPI, VOD, and so on), and receives content data from the content server 150 corresponding to service platform. Namely, the proxy server 145 performs relay of content data, protocol conversion, encryption and so on.

On receiving a mobile data service request from the user terminal 110, the proxy server 145 transmits menu data corresponding to service items available at the content server 150 corresponding to the user terminal's service platform to the user terminal 110. Also, on receiving a HTTP request from the user terminal 110, the proxy server 145 receives content data from the content server and transmits the received content data to the user terminal 110 via the data service apparatus 130. HTTP Request is one of content data request and content data upload request, however, hereinafter assume that HTTP Request is the content data request.

Also, the proxy server 145 further generates Hash value by using URL of HTTP Request from the user terminal 110, and inserts the generated Hash value into the header of HTTP Response (content data can be comprised) being received from the content server 150 to transmit to the user terminal 110.

The content server 150, which is coupled to the mobile communication service system 120 via a mobile network and provides content data requested by the user, is one of a ring sound providing server, a wallpaper providing server, a stock information providing server and so on.

As shown in FIG. 1, one TCP session between the user terminal 110 and the proxy server 145 is set up in the mobile communication service such as GPRS (General Packet Radio Service), CDMA-2000(Code Division Multiple Access-2000), WCDMA (Wideband CDMA). Thus, though a user sends HTTP Requests to plural content servers 150, all HTTP Requests are sent to corresponding content servers 150 via the proxy server 145. Also, all HTTP Responses from plural content servers 150 are transmitted to the user terminal 110 via the proxy server 145.

Namely, in case that the user terminal 110 receives content data from plural content servers 150, plural TCP sessions separated by each content server 150 or each service are set up, and service type for each session is changed in the mobile communication service environment. As this, the mobile communication service environment is totally different from the conventional wired Internet environment.

Thus, the billing apparatus 140 for extracting packet between the user terminal 110 and the proxy server 145 detects usage data for plural web services in one TCP session, not plural TCP sessions being distinguished by the type of content server 150 or service type.

Figure 2:
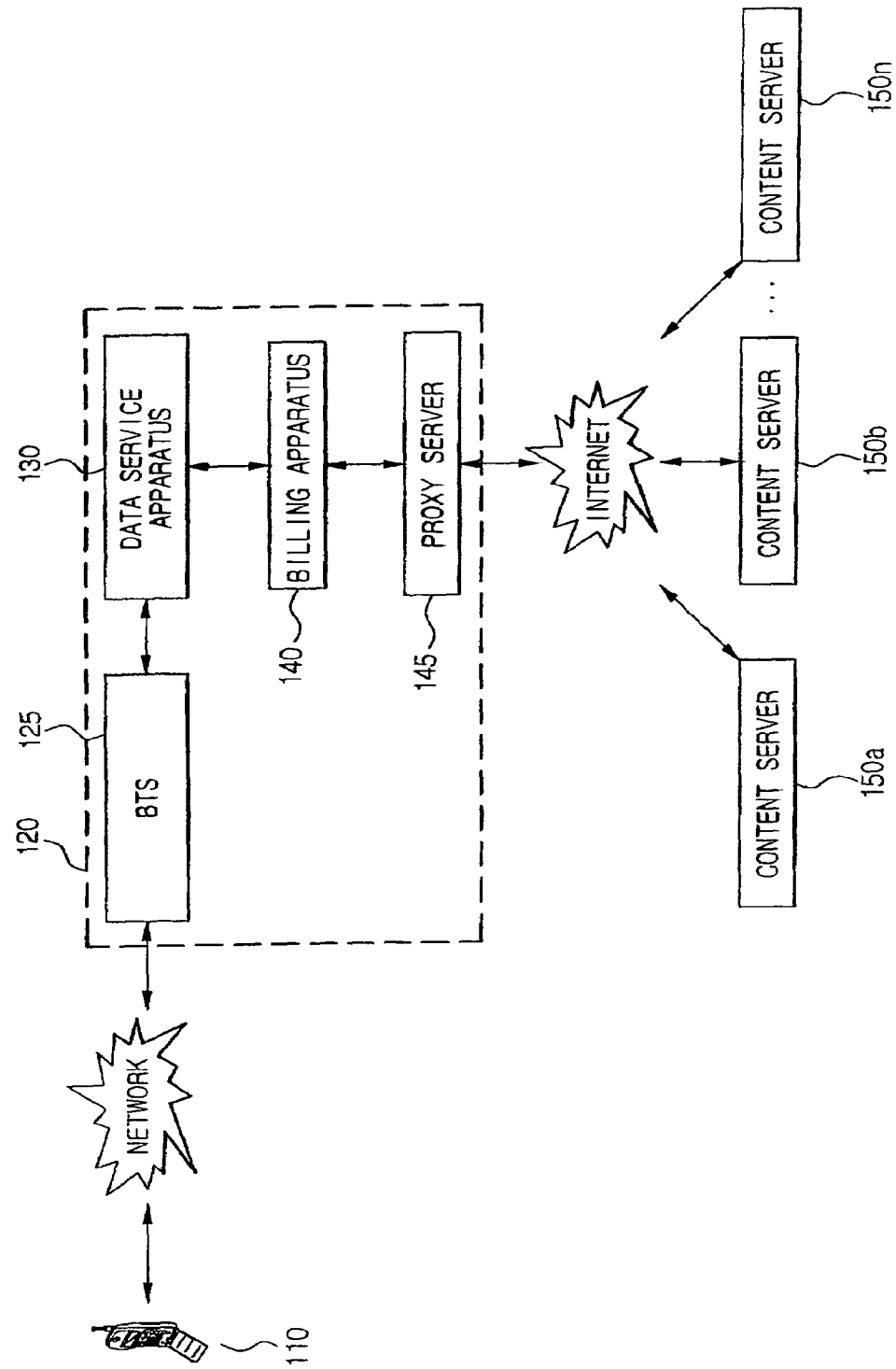
FIG. 2 is a block diagram of a mobile communication service system according to another embodiment of the present invention.

FIG. 2 is a block diagram of the mobile communication service system according to another embodiment of the present invention.

As shown in FIG. 2, the mobile communication service system 120 comprises the billing apparatus 140 being located between the data service apparatus 130 and the proxy server 145. Thus, the packet duplication apparatus 135 can be omitted.

The billing apparatus 140 checks if content data transmission is completed normally by using packet data transceived between the data service apparatus 130 and the proxy server 145, and in case of normal completion, generates billing data for the usage of mobile data service.

Of course, it is apparent that any configuration, that can check if content data transmission is completed by using packet data communicated between data service apparatus 130 and the proxy server 145 and generate billing data, may be applied without limitation.

Figure 3:
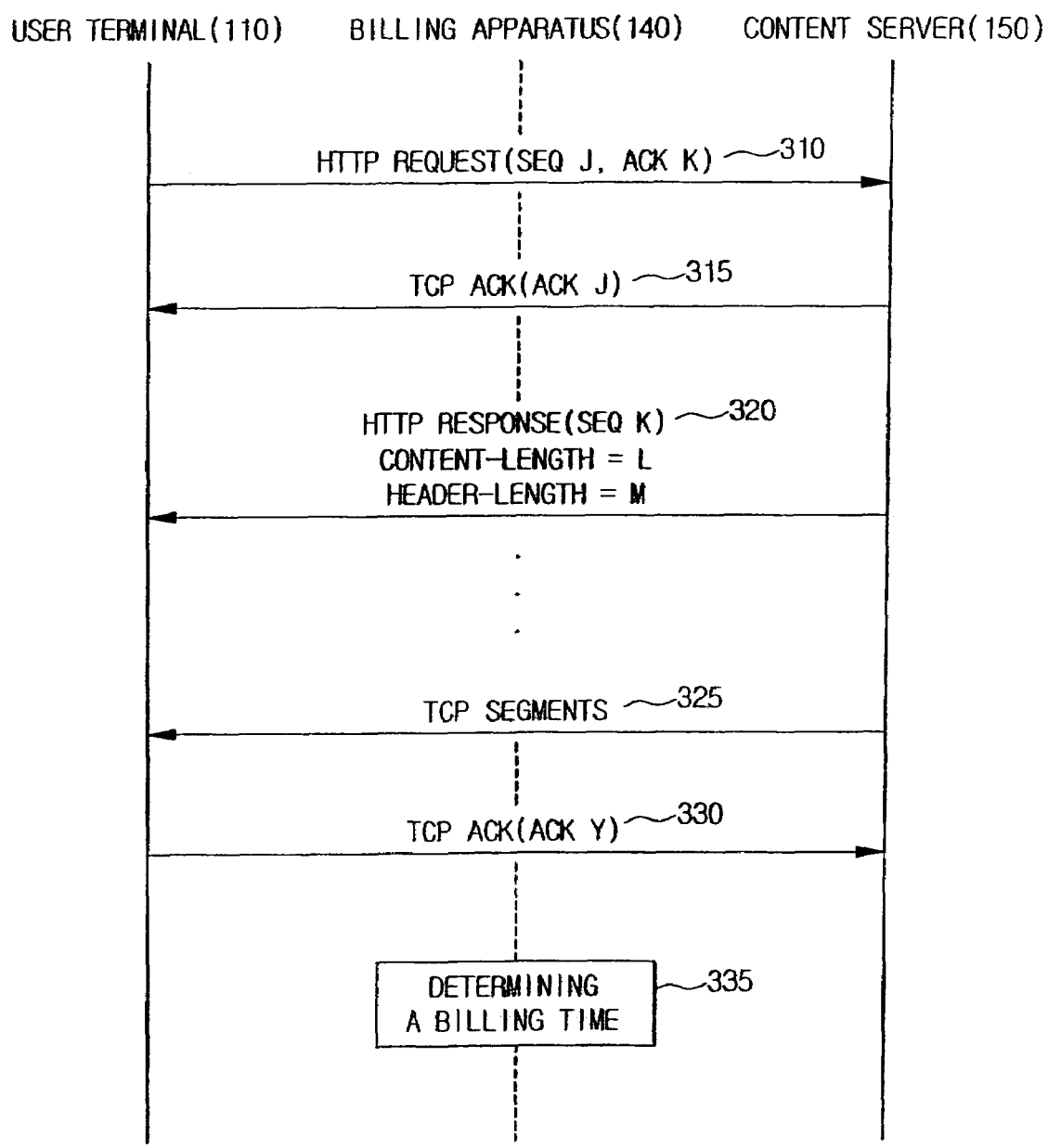
FIG. 3 is a data flowchart for determining the time to generate billing data at the billing apparatus.
Figure 4:
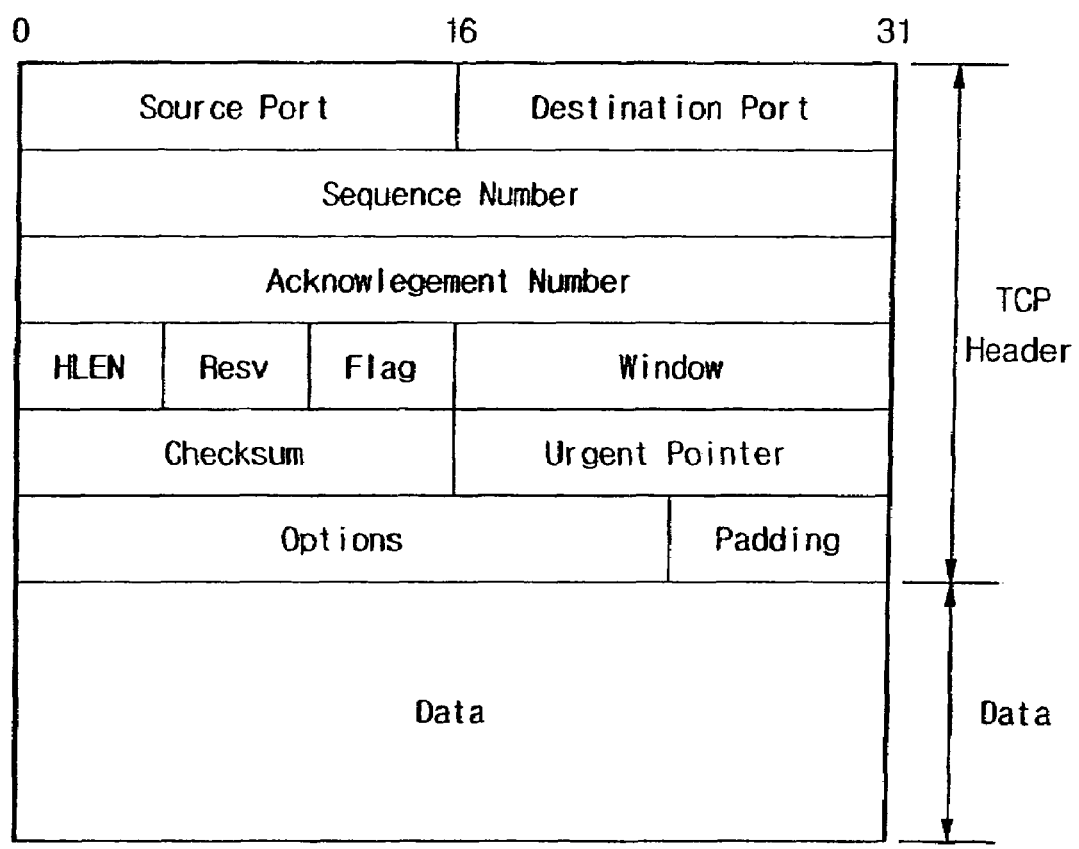
FIG. 4 shows a conventional structure of a TCP segment.

FIG. 3 is a data flowchart for determining the time to generate billing data at the billing apparatus, and FIG. 4 shows TCP segment structure.

FIG. 3 shows the method for determining the time to generate billing data that is used for the billing apparatus 140 to determine the completion of HTTP-based content transmission in the state that TCP session between the user terminal 110 and the content server 150 is set up by TCP handshaking.

Referring to FIG. 3, at step 310, the user terminal 110 designates content to be received in the form of URL by use of HTTP GET method and transmits to the content server. HTTP GET method attaches information to the URL. It is apparent that the HTTP Response is transmitted to the content server 150 via the data service apparatus 130 and the proxy server 145 so that detailed description will be omitted here.

At step 310, the billing apparatus 140 acquires HTTP GET method and URL from the TCP packet that is corresponding to the HTTP request transceived between the data service apparatus 130 and the proxy server 145. Also, the billing apparatus 140 acquires a sequence number assigned to the TCP packet as a parameter (hereinafter, "J value"), and ACK (Acknowledgement) number as a parameter (hereinafter, "K value"). Where, J value is a serial number representing the first octet of HTTP Request, K value is a serial number representing the first octet of HTTP Response.

Hereinafter, TCP segment format is described with FIG. 4.

TCP segment is a basic unit that is transmitted by TCP (Transmission Control Protocol). TCP segment is divided into TCP header and data, and TCP header comprises a fixed header of 20 bytes and an option field.

Source port and destination port are port numbers designating application programs on each end-side of TCP connection.

Sequence number designates where data in the segment locates in byte stream of the application program.

Acknowledge number is a response of a receiver for the segment from a sender, and designates byte number of segment to be received.

Header length is an integer value and designates how many 32-bit words are included.

Window size designates size of available buffer of a receiver, and flow control between each end is performed.

Checksum is for detecting error in TCP segment and the rear part of 12 bytes of IP header.

Urgent pointer designates where urgent data locates.

Referring FIG. 3 again, at step 315, the content server 150 transmits TCP ACK message to the user terminal 110. TCP ACK message indicates that the content server received HTTP Request. The step 315 can be omitted.

After performing process corresponding to HTTP Request being received from the user terminal 110, the content server 150 generates HTTP Response to the user terminal at step 320. At this time, TCP sequence number of the first packet of HTTP Response is K value. And, HTTP Response header in TCP packets having K value as sequence number among packets, that the content server 150 transmitted to the user terminal 110, has a content length field. According to HTTP specification, the content length field must indicate an accurate size of message body of HTTP Response. Thus, at step 320, the billing apparatus 140 can acquire the content length field value as a parameter (hereinafter, "L value"). Also, billing apparatus 140 calculates an octet size from the start of TCP payload of the first packet to the first blank line (only CRLF exists on one line) of HTTP Response to acquire a parameter (hereinafter, "M value").

The content server 150 can transmit HTTP Response consisting of more than one IP packet to the user terminal 110. When receiving HTTP Response, the user terminal 110 can transmit ACK messages to the content server at intervals before HTTP Response is completed (step 325, 330).

At step 330, the billing apparatus 140 keeps checking ACK messages, which are transmitted from the user terminal 110 to the content server 150, to acquire ACK number as a parameter (hereinafter, "Y value").

At step 335, the billing apparatus 140 checks that sum of K value, L value, M value is less than Y value. Namely, if Y value is equal to or higher than the sum, the billing apparatus 140 determines that HTTP Response that the content server 150 intended to transmit is transmitted to the user terminal 110 normally, and starts to generate billing data. But, if Y value is less than the sum, the billing apparatus goes back to the step 330 to acquire Y value.

As described above, the billing apparatus 140 acquires ACK number (K value) included in HTTP Request at step 310, and content length (L value) in HTTP Response and header length (M value) of HTTP header at step 320. And, at step 330, the billing apparatus 140 acquires ACK number (Y value) of TCP ACK message. When Y value is equal to or higher than the sum of K value, L value and M value, the billing apparatus 140 determines that the transmission of content is completed and performs billing.

But, if Y value is less than the sum, the billing apparatus 140 determines that the transmission of content is not completed and can defer billing. Also, if TCP session is released even when Y value is less than the sum, the billing apparatus determines that the transmission of content is failed and performs billing corresponding to the failure. Also, it is possible to generate no billing data. Also, since the message body does not exists in HTTP Response for HTTP Request including HEAD method or HTTP Response including HTTP Response code such as 1xx, 204, 304, the billing apparatus 140 regards that these messages are not a billing target. It is because the content is not transmitted in this case. For reference, HEAD method does not allow to include any data in the message body of HTTP Response. Informational 1xx means a temporary response. Response code 204 is used when although the content server received HTTP Request, there is no data to be transmitted.

Also, if there is no Content-length field and there is Transfer-coding field instead of identity field in HTTP Response, the billing apparatus 140 can perform a process by replacing Content-length value with Transfer-length value.

Figure 5:
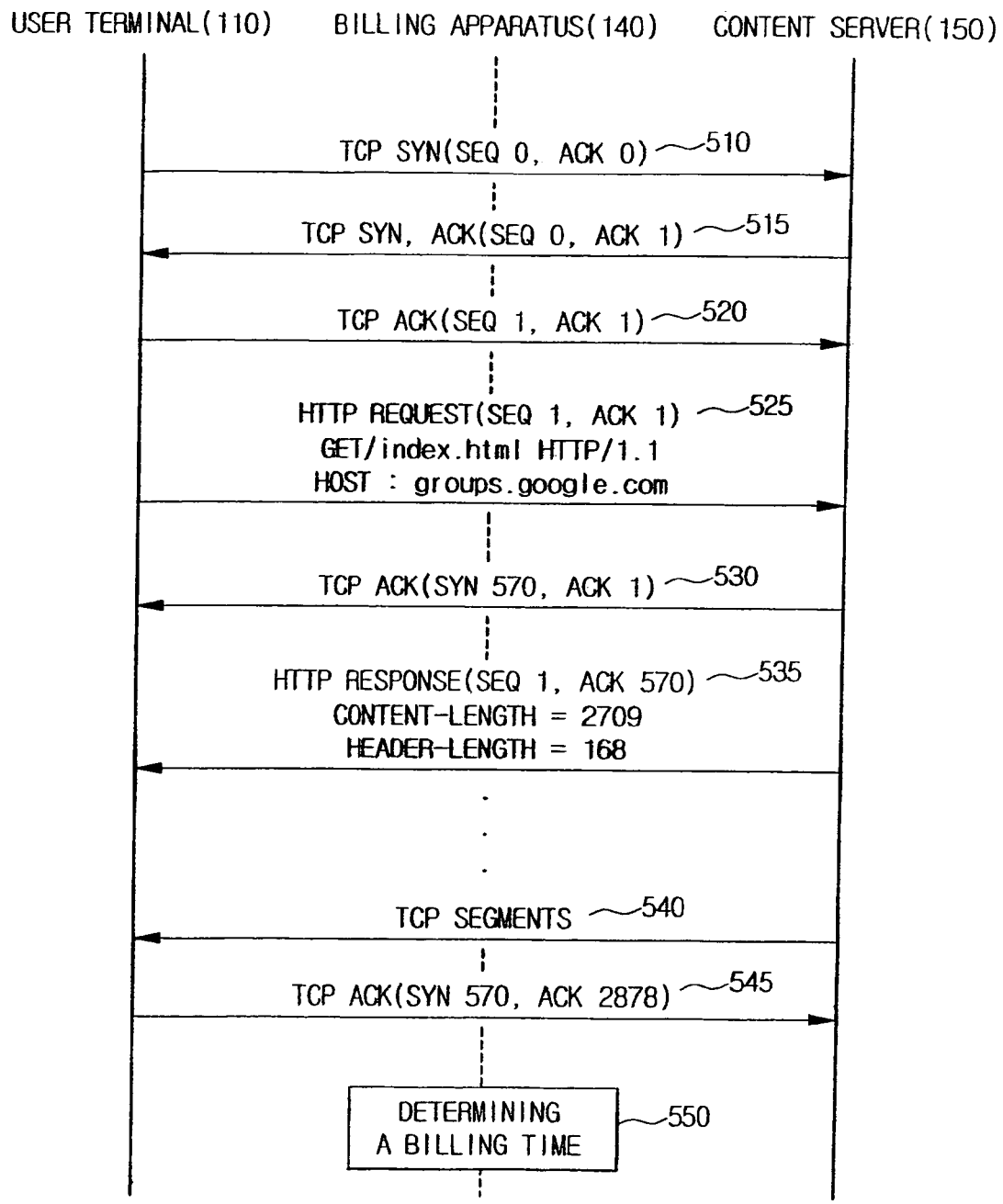
FIG. 5 is a data flowchart for determining the time to generate billing data at the billing apparatus according to another embodiment of the present invention.

FIG. 5 is a data flowchart for determining the time to generate billing data at the billing apparatus according to another embodiment of the present invention.

FIG. 5 shows an actual packet data transmission procedure between a user terminal 110 and a content server 150 when the user access to a content server (i.e., groups.google.com) 150 via the mobile communication service system 120. But, only packet data relating to embodiments of the present invention among packet data to be transceived between the user terminal 110 and the content server 150 at TCP level will be described.

Referring to FIG. 5, the user terminal 110 and the content server 150 set up TCP session through transmission of TCP packet at step 510 through 520.

At step 525, the user terminal 110 transmits HTTP Request to the content server 150. HTTP Request includes URL corresponding to 'http://groups.google.com/index.html'. And, the billing apparatus 140 acquires sequence number '1' in HTTP Request as J value and ACK number '1' as K value.

At step 530, the content server 150 can transmit ACK message having J value as ACK number to confirm the receipt of HTTP Request to the user terminal 110.

At step 535, the content server 150 starts to transmit HTTP Response to the user terminal 110. The billing apparatus 140 receives HTTP Response to be transmitted to the user terminal from the content server 150, and acquires Content-length value '2709' in header of HTTP Response as L value. Also, the billing apparatus 140 calculates Header-length to acquire the calculated header length '168' as M value.

Then, TCP segments can be transmitted to the user terminal 110 from the content server 150 continuously (step 540). When TCP ACK message is transmitted to the content server 150 from the user terminal 110, the billing apparatus 140 acquires ACK number of the TCP ACK message, which is transmitted from the packet duplication apparatus 135, '2878' as Y value (step 545).

At step 550, the billing apparatus 140 checks whether or not the content is normally transmitted from the content server 150 to the user terminal 110 by comparing a sum of K value, L value and M value with Y value. And, if the content transmission is completed normally, then the billing apparatus starts billing. Namely, if Y value is equal to or higher than the sum, then the transmission of content is regarded as normal completion. In the data flow in FIG. 5, Y value ('2878') and the sum ('2878') of K value ('1'), L value ('2709') and M value ('168') are equal so that the billing apparatus determines that the transmission of content is completed normally. And, the billing apparatus 140 performs billing by using basic billing data such as a size of content included in HTTP Response, a network usage time, and so on. Of course, it is apparent that conventional method or any method to be developed for generating billing data can be used in the billing apparatus 140 without any limit.

And, when applying a method for comparing Y value with the sum of K value, L value and M value to the content server 150, it is also possible for the content server 150 to check whether or not the content is transmitted to the user terminal 110 normally. Thus, if it is not considered as a normal transmission, the content server 150 can retransmit the content.

Figure 6:
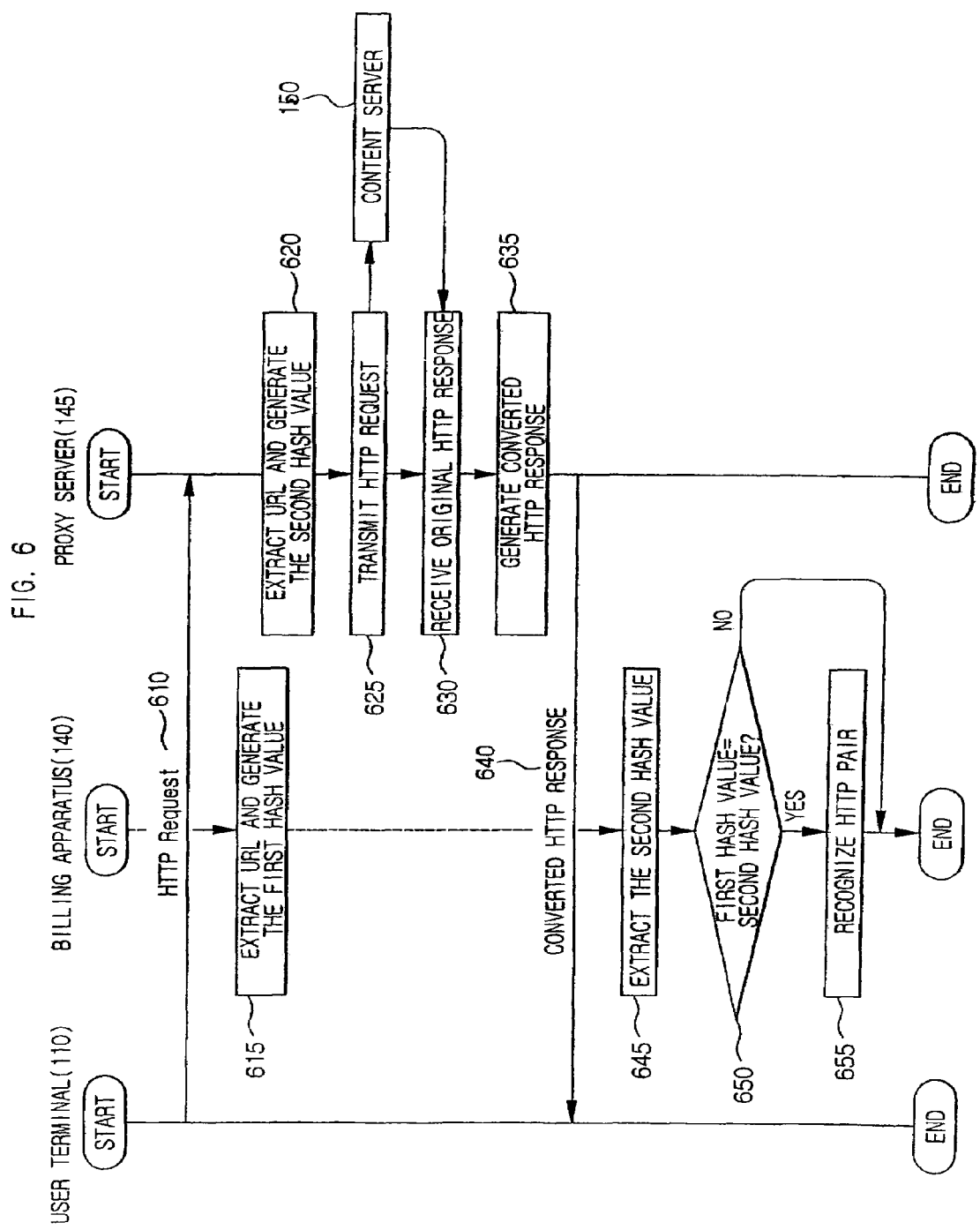
FIG. 6 is a flowchart for recognizing a transaction in mobile data service according to another embodiment of the present invention.

FIG. 6 is a flowchart for recognizing a transaction in mobile data service according to another embodiment of the present invention.

Referring to FIG. 6, at step 610, the user terminal 110 transmits HTTP Request for a content selected by user to the proxy server 145 via network. HTTP Request is delivered to the proxy server 145 via BTS 125, the data service apparatus 130, the packet duplication apparatus 135, and so on.

At step 615, the billing apparatus 140 receives the duplicated HTTP Request from the packet duplication apparatus 135, and extracts URL from the HTTP Request. And, the billing apparatus 140 generates the first hash value by use of the extracted URL and the predetermined Hash function. If the Hash function for generating the first hash value is identical with the Hash function for generating the second hash value in the proxy server 145, any suitable Hash function can be used in embodiments of the present invention. In one embodiment, the Hash function includes MD5, SHA-1, HAS-160, and so on. Since parameters and method for generating hash value by using Hash function are well known in the art, detailed description will be omitted.

At step 620, the proxy server 145 receives HTTP Request from the user terminal 110, and extracts URL from HTTP Request. And, the proxy server 145 generates the second hash value by use of the extracted URL and the predetermined Hash function. The Hash function used by the proxy server 145 must be identical with the Hash function used by the billing apparatus 140.

At step 625, the proxy server 145 transmits HTTP Request from the user terminal 110 to the corresponding content server 150.

Then, the proxy server 145 at step 630 receives original HTTP Response including content data corresponding to HTTP Request (e.g., stock information request) from the content server 150.

Since the proxy server 145 can recognize that the original HTTP Response at step 630 corresponds to which one of HTTP Requests, the proxy server 145 inserts the second hash value as a new field value into the header of original HTTP Response header to generate a converted HTTP Response at step 635. There is no limit to the newly-inserted field name for the proxy server 145 to insert the second hash value into the original HTTP Response if the newly-inserted field name is not identical with a field name that is already used between the user terminal 110 and the proxy server 145 or the user terminal 110 and the content server 150.

And, the proxy server 145 at step 640 transmits the converted HTTP Response to the user terminal 110 via network. At this time, the converted HTTP Response is transmitted to the user terminal 110 via the packet duplication apparatus 135, the data service apparatus 130, BTS 125, and so on.

At step 645, the billing apparatus 140 receives the converted HTTP Response that the packet duplication apparatus 135 duplicated, and extracts the second hash value from the header field of the converted HTTP Response. In order for the billing apparatus 140 to extract the second hash value, the field name for the second hash value must be shared with the proxy server 145 and the billing apparatus 140.

At step 650, the billing apparatus 140 determines whether or not the first hash value generated at step 615 and the second hash value extracted at step 645 are identical. If identical, the billing apparatus 140 at step 655 recognizes that converted HTTP Response is the response of HTTP Request transmitted at step 610. Namely, HTTP Request and converted HTTP Response are regarded as a pair. But, if not identical, the billing apparatus 140 regards HTTP Request and converted HTTP Response as different messages and ends the step. Of course, the step 645 through 655 can be repeated until receiving the converted HTTP Response corresponding to HTTP Request.

For example, if the user terminal 110 transmits the first HTTP Request and the second HTTP Request to the proxy server 145, the billing apparatus 140 generates the first hash value for the first duplicated HTTP Request received from the packet duplication apparatus 135 and the second hash value for the second HTTP Request.

And, the proxy server 145 transmits the first HTTP Request and the second HTTP Request to the corresponding content servers 150, respectively. And, during this procedure, the third hash value and the fourth hash value corresponding to the first HTTP Request and the second HTTP Request respectively are generated and stored.

When receiving original HTTP Response from the content server 150, the proxy server 145 determines that the original HTTP Response corresponds to which one of the first HTTP Request and the second HTTP Request. And, the proxy server 145 generates the converted HTTP Response by inserting corresponding hash value into the header of the original HTTP Response. And, the proxy server 145 transmits the converted HTTP Response to the user terminal 110.

The billing apparatus 140 receives the converted HTTP Response from the packet duplication apparatus 135, and extracts the hash value from the header of the converted HTTP Response. The billing apparatus 140 determines that the extracted hash value corresponds to which one of the first hash value and the second hash value and recognizes the converted HTTP Response as a pair of HTTP Request corresponding to the hash value.

If two sequential HTTP Requests (i.e., the first HTTP Request and the second HTTP Request) for same URL are transmitted from the user terminal 110 to the proxy server 145, all hash values generated by the billing apparatus 140 and the proxy server 145 may be identical. In this case, the time sequence of each HTTP Request cannot be distinguished by using hash values. But, in case of same URL, two HTTP Responses (i.e., the first converted HTTP Response and the second converted HTTP Response) for tow HTTP Requests are actually same at HTTP message level so that the billing apparatus 140 can perform HTTP pair matching regardless of arriving order of HTTP Request and HTTP Response.

Also, although HTTP Responses that are transmitted from the content server 150 as responses for plural HTTP Requests for same URL may be different from each other, this case happens only when the network between the user terminal 110 and the content server 150 is unstable.

Figure 7:
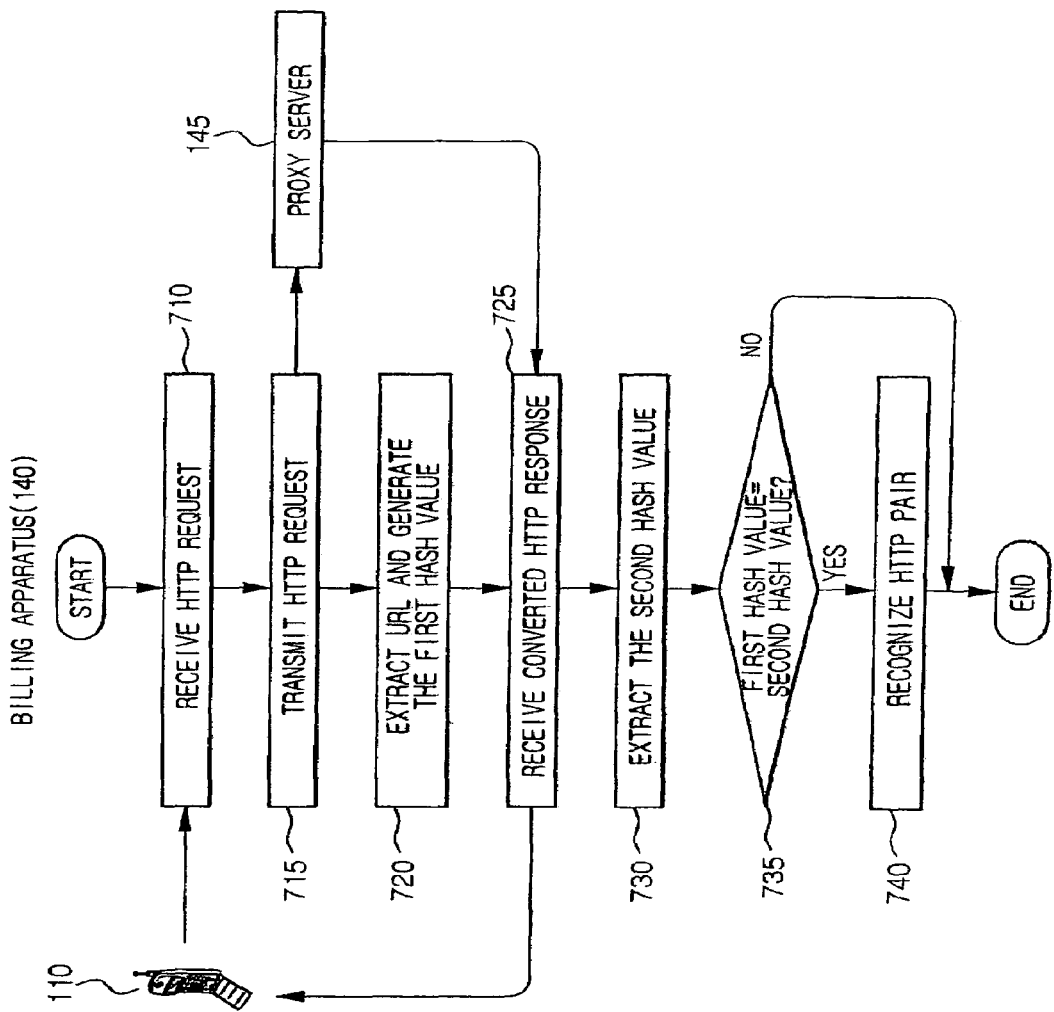
FIG. 7 is a flowchart for recognizing a transaction in mobile data service according to another embodiment of the present invention.

FIG. 7 is a flowchart for recognizing a transaction in mobile data service according to another embodiment of the present invention.

The flowchart in FIG. 7 shows the method for recognizing transaction when the billing apparatus 140 locates between the data service apparatus 130 and the proxy server 145 as shown in FIG. 2. Namely, FIG. 7 shows the method for recognizing HTTP Request/Response when packet data being transceived between the user terminal 110 and the content server 150 always goes through the billing apparatus 140.

Referring to FIG. 7, at step 710, the billing apparatus 140 receives HTTP Request for any content from the user terminal 110. The billing apparatus 140 at step 715 transmits the received HTTP Request to the proxy server 145. And, at step 720, the billing apparatus 140 generates the first hash value by using URL included in the HTTP Request and the predetermined Hash function. Of course, the order of step 715 and 720 can be changed.

The billing apparatus 140 at step 725 receives the converted HTTP Response from the proxy server 145, and transmits the converted HTTP Response to the user terminal 110. As the method for generating the converted HTTP Response at the proxy server is same to the method as already described in FIG. 6, same description is omitted.

At step 730, the billing apparatus 140 extracts the second hash value from the header of the converted HTTP Response received at the step 725. At step 735, the billing apparatus determines whether or not the first hash value at step 720 and the second hash value at step 730 are identical. If identical, the billing apparatus recognizes the converted HTTP Response as a response of HTTP Request at step 715. Namely, HTTP request and the converted HTTP Response are recognized as a pair. But, if not identical, HTTP Request and the converted HTTP Response are recognized as separate ones and the step is ended. Of course, the step 725 to step 740 can be repeated until the converted HTTP Response corresponding to the HTTP Request is received. Also, the step of transmitting the converted HTTP Response to the user terminal 110 can be performed after finishing the step 730 to 740 by using the converted HTTP Response.

Figure 8:
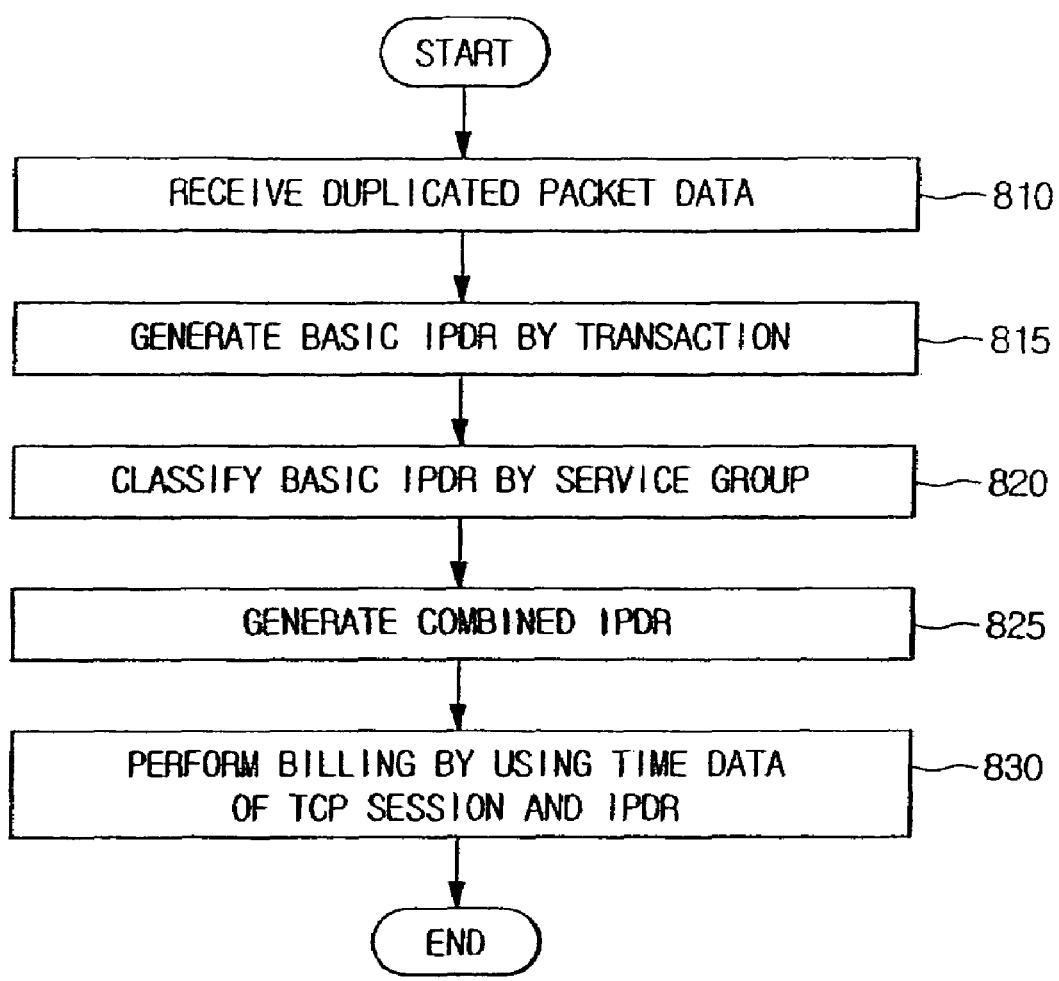
FIG. 8 is a flowchart of method for generating combined billing data for each service according to another embodiment of the present invention.
Figure 9:
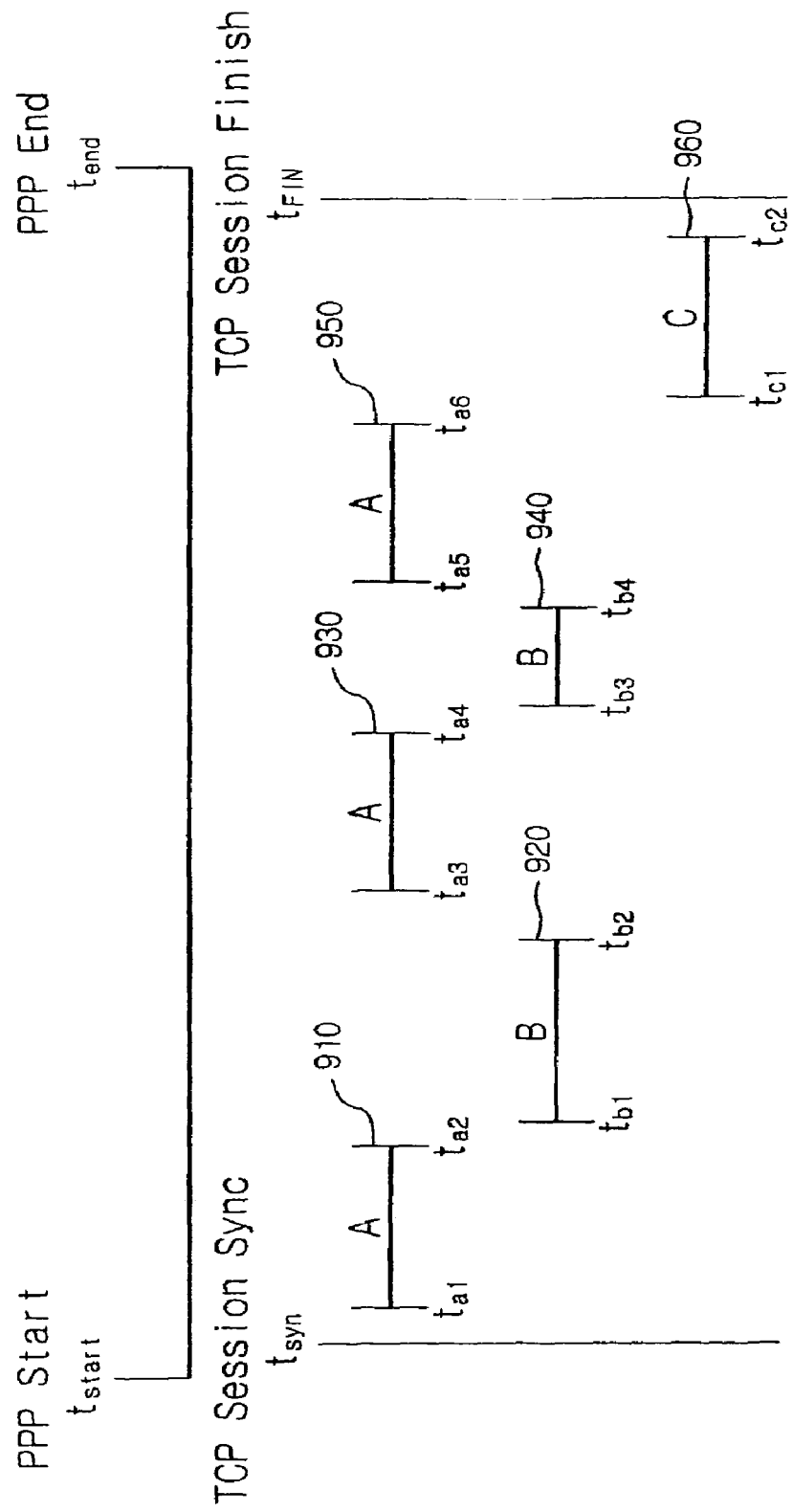
FIG. 9 shows the use flow of mobile data service according to another embodiment of the present invention.
Figure 10:
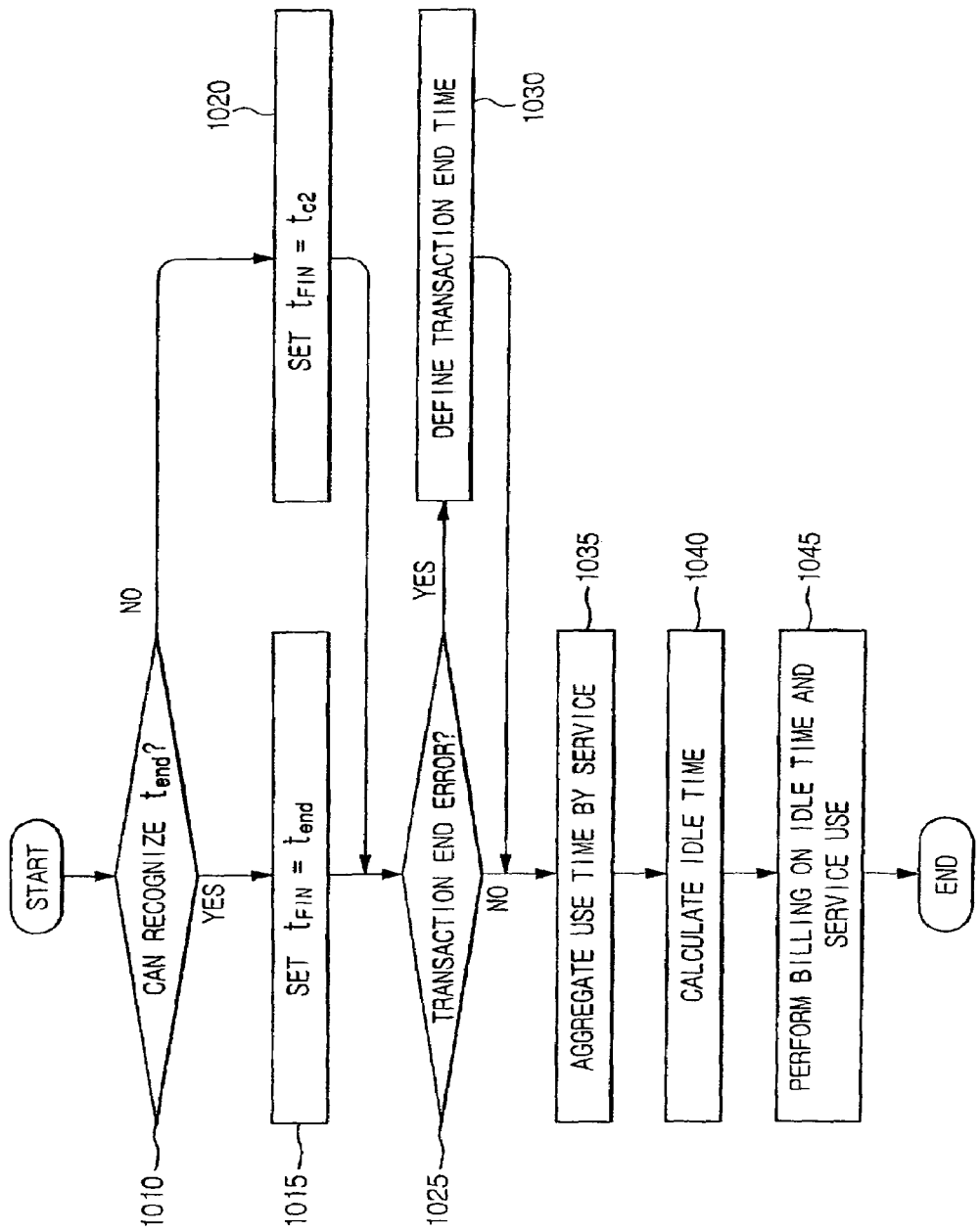
FIG. 10 is a flowchart of method for eliminating errors when the combined IPDR is generated according to another embodiment of the present invention.

FIG. 8 is a flowchart of method for generating combined billing data for each service according to another embodiment of the present invention, FIG. 9 shows the use flow of mobile data service according to another embodiment of the present invention, and FIG. 10 is a flowchart of method for eliminating errors when the combined IPDR is generated according to another embodiment of the present invention.

Referring to FIG. 8, the billing apparatus 140 at step 810 receives duplicated packet data from the packet duplication apparatus 135, and generates basic IPDR by a transaction at step 815. As above described, the packet duplication apparatus 135 can be removed. In one embodiment of the present invention, transaction is a pair of HTTP Request and corresponding HTTP Response transceived between the user terminal 110 and the proxy server 145 in one TCP session. Basic IPDR comprises each start time and end time of transaction (e.g., start time and end time of HTTP Request, start time and end time of HTTP Response), a size of packet data composing the transaction, an access address of the content server 150 (e.g., all lists of URL used for each transaction), user information, a termination reason of Internet use (e.g., normal termination, abnormal termination), and so on.

There is no limit on which method the billing apparatus 140 uses for recognizing transaction. But, two methods for the billing apparatus 140 to recognize the transaction will be described for the purpose of understanding.

First, it can be used to recognize the transaction that the billing apparatus 140 and the proxy server 145 generate each hash value by using same Hash function, respectively, and then the billing apparatus 140 checks that the generated hash values are identical each other. Of course, the procedure of recognizing transaction by hash value matching can be performed by an additional data analyzing apparatus (not shown), and the billing apparatus 140 can generate basic IPDR by a transaction by using the transaction recognition result of the data analyzing apparatus.

Hereinafter, the method for recognizing transaction by hash value matching will be described in brief.

When the user terminal 110 transmits HTTP Request for any content, the HTTP Request is delivered to the proxy server 145 via the data service apparatus 130, the packet duplication apparatus 135, and so on. The billing apparatus 140 (or data analyzing apparatus) receives the duplicated HTTP Request from the packet duplication apparatus 135, and extracts URL from the duplicated HTTP Request. And, the billing apparatus 140 generates the first hash value by using the extracted URL and the predetermined Hash function (e.g., MD5, SHA-1, HAS-160, and so on). The proxy server 145 extracts URL from the HTTP Request, and generates the second hash value by using the extracted URL and the predetermined Hash function. The proxy server 145 transmits the HTTP Request to the corresponding content server 150, and receives original HTTP response including content data corresponding to the HTTP Request from the content server 150. Since the proxy server 145 can recognize that the original HTTP Response corresponds to which HTTP Request, the proxy server 145 inserts the second hash value corresponding to the HTTP Request into a new field of the header of the original HTTP Response to generate the converted HTTP Response. And, the proxy server 145 transmits the converted HTTP Response to the user terminal 110 via network, and during this step, the packet duplication apparatus 135 duplicates the converted HTTP Response to transmit it to the billing apparatus 140. The billing apparatus 140 extracts the second hash value from the header field of the converted HTTP Response, and determines whether or not the first hash value and the second hash value are identical each other. If identical, the converted HTTP Response and HTTP Request corresponding to the first hash value are recognized as a pair. The packet duplication apparatus 135 can be removed as aforementioned.

Next, when receiving HTTP Response corresponding to HTTP Request, the proxy server 145 can insert billing data for the HTTP Request and HTTP Response into HTTP Response to transmit to the data service apparatus 130. If using this method, the billing apparatus 140 receives duplicated packet data of HTTP Response including billing data from the packet duplication apparatus 135, and performs the transaction recognition and billing by using the duplicated packet data.

The method for the proxy server to recognize transaction and generating billing data by changing header data of HTTP Response will be described in brief.

When the user terminal 110 transmits HTTP Request for any content, the HTTP Request is delivered to the proxy server 145 via the data service apparatus 130, the packet duplication apparatus 135, and so on. The proxy server 145 transmits the HTTP Request to the corresponding content server 150, and receives original HTTP response including content data (e.g., stock information request) corresponding to the HTTP Request from the content server 150. The proxy server 145 extracts HTTP header data from the original HTTP Response, and inserts basic billing data into HTTP header data to generate the converted HTTP Response. Basic billing data is, for example, one of the number of bytes of HTTP Request, the number of bytes of HTTP Response, an access address of the content server 150, user information, and so on. Since the proxy server 145 manages HTTP information including session information about receiving HTTP Request for which content data from the user terminal 110 and transmitting the HTTP Request to which content server 150, basic billing data can be easily inserted into HTTP header. Then, the proxy server 145 transmits the converted HTTP Response to the user terminal 110 via the packet duplication apparatus 135, the data service apparatus 130, and so on. The packet duplication apparatus 135 duplicates the converted HTTP Response to transmit it to the billing apparatus 140. The billing apparatus 140 performs billing for the transaction by using basic billing data inserted into the header of the converted HTTP Response. Since basic billing data comprises the number of bytes of HTTP Request, the number of bytes of HTTP Response, the access address of content server 150, and so on, it is not needed for the billing apparatus 140 to perform additional billing for HTTP Request and HTTP Response. Also, since the proxy server 145 performs to compose the transaction, it is possible to perform billing only if there exists normal HTTP Response.

Of course, there may be many methods for recognizing transaction (a pair of HTTP Request and HTTP Response) in the billing apparatus 140. And, hereinafter assume that the billing apparatus 140 recognizes a pair of HTTP Request and HTTP Response and composes a transaction.

At step 820, the billing apparatus 140 classifies basic IPDR generated at step 815 into service groups. FIG. 9 shows the use flow of mobile data service of user. A mobile service provider can classify various services into plural service groups (e.g., service group classification based on URL) according to its service plan. Hereinafter, assume that if domain name of access address (e.g., URL) is same then it will be regarded as same service group. And, assume that the use flow of mobile data service in FIG. 9 shows the case that user uses mobile data services which belong to plural service groups such as service group A, service group B and service group C.

The billing apparatus 140 at step 825 aggregates basic IPDRs classified by a service group to generate combined IPDR, and performs billing by use of time data of TCP session and IPDR at step 830.

Hereinafter, with referring to FIGS. 9 and 10, the procedure of generating the combined IPDR and performing billing will be described in detail. As described above, FIG. 9 is a use flow of the mobile data service that user uses plural services (i.e., service group A, service group B and service group C) in one TCP session connected between the user terminal 110 and the proxy server 145. The method for generating the combined IPDR will be described with the use flow of the mobile data service in FIG. 9 and the flowchart in FIG. 10 even if the network is unstable or the user terminal operates abnormally.

Referring to FIG. 10, at step 1010, the billing apparatus 140 determines whether or not an end time of PPP connection $t_{end}$ is recognized. If $t_{end}$ is recognized, $t_{FIN}$ is set up at step 1015. But, if $t_{end}$ is not recognized, the end time of last transaction before end of TCP session $t_{end}$ is set up as $t_{c2}$. Generally, start time of PPP $t_{start}$ and end time of PPP $t_{end}$ can be recognized with high precision in the mobile communication service system 120. Also, the billing apparatus 140 can recognize start time of TCP session $t_{syn}$. But, packet for recognizing $t_{FIN}$ cannot be generated or $t_{FIN}$ cannot exist (e.g., $t_{FIN}$ expands to infinity) due to the instability of network or malfunction of the user terminal 110.

At step 1025, the billing apparatus 140 finds error-occurred transaction among transactions that were generated during the connected TCP session. The billing apparatus 140 can determine the following cases as end error of transaction: the end of any transaction is not recognized, or the end of any transaction is recognized after start of next transaction. If no end error, the billing apparatus goes to step 1035. Generally, to satisfy the condition of no error among plural transactions in TCP session, the use flow of the mobile data service must satisfy the condition as shown in Table 1.

TABLE 1

| Conditions of normal end of transaction | | | |
|---|---|---|---|
| transaction | Start time | End time | Relation |
| 1st transaction (710) | $t_{a1}$ | $t_{a2}$ | $t_{syn} \ne t_{a1}$ |
| 2nd transaction (720) | $t_{b1}$ | $t_{b2}$ | $t_{a2} \ne t_{b1}$ |
| 3rd transaction (730) | $t_{a3}$ | $t_{a4}$ | $t_{b2} \ne t_{a3}$ |
| 4th transaction (740) | $t_{b3}$ | $t_{b4}$ | $t_{a4} \ne t_{b3}$ |
| 5th transaction (750) | $t_{a5}$ | $t_{a6}$ | $t_{b4} \ne t_{a5}$ |
| 6th transaction (760) | $t_{c1}$ | $t_{c2}$ | $t_{a6} \ne t_{c1}$ |

Additionally, the condition that use time of TCP session is not same to the total use time of each transaction must satisfy "$t_{FIN} - t_{syn}$—service group A use time (i.e., $(t_{a2}-t_{a1})+(t_{a4}-t_{a3})+(t_{a6}-t_{a5})$)+service group B use time (i.e., $(t_{b2}-t_{b1})+(t_{b4}-t_{b3})$)+service group C use time (i.e., $(t_{c2}-t_{c1})$)". This means that there generally exists idle time between each transaction.

But, if there is an end error, the end time of transaction is redefined at step 1030. At first, if end of any transaction of TCP session is not recognized, the start time of next transaction will be regarded as the end time of the transaction. For example, if the end of the third transaction 930 is not recognized, the end time $t_{a4}$ of transaction 930 will be the start time of the fourth transaction 940 $t_{b3}$.

Next, if any transaction ends after a next transaction started, the end time of the transaction will be redefined as the start time of the next transaction according to the billing policy. For example, if the first transaction 910 ends after the start time $t_{b1}$ of the second transaction 920, the end time $t_{a2}$ of the first transaction 910 can be redefined as the start time $t_{b1}$ of the second transaction 920.

Then, at step 1035, the billing apparatus 140 aggregates use time of each service. Namely, the billing apparatus 140, as described above, classifies each transaction into corresponding service groups, and aggregates use time of classified transactions of each service group.

Also, at step 1040, the billing apparatus 140 calculates idle time. The idle time means time that TCP session is connected but not occupied by any transaction (i.e., $t_{IDLE}=(t_{FIN}-t_{syn})-$(service group A use time+service group B use time+service group C use time)).

At step 1045, the billing apparatus 140 performs billing for service use (i.e., data service use time and content usage charge) and the calculated idle time. Since the billing apparatus according to one embodiment of the present invention can calculate the service use time and idle time with high precision, it is possible to perform an optimized billing for the mobile data service use. Namely, one embodiment of the present invention can solve the problem of charging the idle time with high rate.

In describing the method for generating combined billing data for each service till now, we mainly described the method that classifies plural transactions during the TCP session into service groups based on the access address and then aggregates use time of plural transactions of same service group to perform billing. Namely, it was assumed that charge for use time (i.e., network usage charge) or content usage charge per service group is applied equally.

But, in some cases, although transactions are included in the same service groups, only network usage can be charged to one transaction (e.g., content data search service), or network usage and content usage can be charged to another transaction (e.g., content download service).

Also, although transactions are generated in one TCP session, one transaction can be charged according to use time, or another transaction can be charged according to amount of packet use.

But, it is apparent that the aforementioned method for aggregating transaction according to service group can be applied to these cases. In this case, for example, it will be enough to equip a detailed service group (e.g., time billing service, packet billing service, content usage billing service, etc.) subordinated to a service group that is determined by URL, so detailed description will be omitted. Of course, it is also apparent that various methods for classifying service groups can be applied for charging mobile data service use according to various services having different charges.

Until now, we mainly described the system of generating combined billing data for each service with the packet duplication apparatus 135. And, in this case, the billing apparatus 140 generated basic IPDR and combined IPDR by using duplicated packet data transmitted from the packet duplication apparatus 135 (referring FIG. 1). But, as shown in FIG. 2, the packet duplication apparatus can be removed, and without packet duplication apparatus, the billing apparatus 140 can generate basic IPDR and combined IPDR by similar way. Namely, the billing apparatus 140 generates basic IPDR and combined IPDR by using packet data that goes through itself. If the packet duplication apparatus 135 is not included, since it is apparent for those skilled in the art to construct the method of billing apparatus 140 for generating IPDR with ease, detailed description will be omitted.

As described above, embodiments of the present invention can generate reliable billing data by generating billing data after finishing the transmission of content data. Furthermore, embodiments of the invention can provide the following advantages.

One embodiment of the present invention can easily check if data transmission is completed normally by analyzing packet transceived between the mobile terminal and the content server.

Another embodiment of the present invention can prevent an occurrence of the billing error, and can share a Hash function in mobile communication service system to recognize transaction easily.

Another embodiment of the present invention can provide the detailed and rigid billing for Internet services and contents through the transaction recognition.

Another embodiment of the present invention can recognize transaction based on network packet or HTTP message in communicating HTTP request message and HTTP Response message between the mobile terminal and the proxy server by using persistent connection.

Another embodiment of the present invention can perform detailed accounting for each service by generating IPDR combining time billing data and packet billing data of each service being used in same session.

Still another embodiment of the present invention can generate accurate IPDR even if repeated transaction, unfinished transaction or unfinished session happens.

Still another embodiment of the present invention can distinguish packet transmission time and idle time in same data session and apply a separate billing policy to the idle time.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A method of recognizing a transaction for a billing apparatus, comprising: receiving a duplicated hyper text transfer protocol (HTTP) request from a packet duplication apparatus, wherein the duplicated HTTP request is a duplication data of a HTTP request being transmitted from a user terminal to a proxy server via the packet duplication apparatus and is duplicated by the packet duplication apparatus; extracting an access address from the duplicated HTTP request; generating a first hash value based on the access address and a predetermined hash function; receiving a duplicated HTTP response from the packet duplication apparatus, wherein the duplicated HTTP response is a duplication data of a converted HTTP response being transmitted from a content server to the user terminal via the packet duplication apparatus and is duplicated by the packet duplication apparatus; extracting a second hash value from the duplicated HTTP response; comparing the first hash value with the second hash value; and determining the HTTP request and the converted HTTP response as a transaction if the first hash value is the same as the second hash value, wherein the transaction is a pair of the HTTP request and the converted HTTP response: wherein in order to generate the converted HTTP response including the second hash value, the proxy server is configured to: receive the HTTP request; generate the second hash value based on the access address and the predetermined hash function; transmit the HTTP request to the content server corresponding to the access address; receive an original HTTP response corresponding to the HTTP request from the content server; and insert the second hash value into a header of the original HTTP response so as to generate the converted HTTP response.

2. The method in claim 1, wherein the access address is a uniform resource locator (URL).

3. The method in claim 1, wherein the converted HTTP response is transmitted to the user terminal via a data service apparatus, wherein the data service apparatus is one of the following: an interworking function (IWF), a packet data serving node (PDSN), a serving GPRS supporting node (SGSN), and a gateway GPRS supporting node (GPRS).

4. A method of recognizing a transaction for a billing apparatus, comprising: receiving a hyper text transfer protocol (HTTP) request from a data service apparatus; extracting an access address from the HTTP request; generating a first hash value based on the access address and a predetermined Hash function; transmitting the HTTP request to a proxy server; receiving a converted HTTP response from the proxy server, wherein the converted HTTP response comprises a second hash value and an original HTTP response corresponding to the HTTP request; extracting the second hash value from the converted HTTP response; comparing the first hash value with the second hash value; determining the HTTP request and the converted HTTP response as a transaction if the first hash value is the same as the second hash value, wherein the transaction is a pair of the HTTP request and the converted HTTP response; and transmitting the converted HTTP response to the data service apparatus, wherein in order to generate the converted HTTP response the proxy server is configured to: receive the HTTP request; generate the second hash value based on the access address and the predetermined hash function; transmit the HTTP request to the content server corresponding to the access address; receive the original HTTP response corresponding to the HTTP request from the content server; and generate the converted HTTP response based on the second hash value and the original HTTP response.

5. A method of generating a billing data at a billing apparatus for use of mobile data services, the method comprising:
(a) recognizing a transaction based on packet data transmitted between a data service apparatus and a proxy server, wherein the transaction is a pair of a hyper text transfer protocol (HTTP) request and a HTTP response corresponding to the HTTP request;
(b) generating a basic Internet protocol detail record (IPDR) per a transaction, wherein the basic IPDR comprises a start time and an end time of the transaction, an amount of packet data, and an access address;
repeating (a) and (b) until the end of a transmission control protocol (TOP) session between the user terminal and the proxy server; and generating a combined IPDR from aggregating a plurality of basic IPDRs, wherein the basic IPDRs, classified as a same service group, are combined together, wherein the generating of the combined IPDR comprises: recognizing an end of a TCP session;
(c) checking an end error in one of transactions based on the basic IPDR;
(d) redefining the start time or the end time of the transaction if there exists the end error;
(e) classifying the basic IPDR into one of predetermined service groups based on the access address included in the basic IPDR;
repeating (c) to (e) for all basic IPDRs generated during the connection of a TCP session; and
generating the combined IPDR from aggregating the amount of service use time for each service group, wherein the aggregated service use time is a sum of differences between the end time and the start time of transactions in each service group, wherein the end error is either a first error in which an end of transaction is not recognized or a second error in which when plural transactions occur during one TCP session connection, the end time of preceding transaction occurs after the start time of following transaction, and wherein the redefining the start time or the end time of the transaction if there exists the end error is to set the end time of preceding transaction to be the same as the start time of following transaction.

6. The method in claim 5, wherein the billing apparatus is configured to perform (a) and (b) based on the packet data if the data service apparatus, the billing apparatus and the proxy server are located on a transmission line of the packet data.

7. The method in claim 5, wherein the billing apparatus is configured to perform (a) and (b) based on the packet data being duplicated by the packet duplication apparatus if the data service apparatus, the packet duplication apparatus and the proxy server are located on a transmission line of a packet data and the packet duplication apparatus and the billing apparatus are coupled to each other.

8. The method in claim 5, wherein the access address is a uniform resource locator (URL).

9. The method in claim 5, further comprising:
calculating the total amount of service use time of the user terminal during the TCP session connection; calculating a connection time of the TCP session; calculating an idle time by subtracting the total service time from the connection time of a TCP session; and billing the service use time and the idle time at a different rate.

10. The method in claim 9, wherein the calculating a connection time of the TCP session comprises: calculating the connection time of a TCP session by subtracting a start time of the TCP session from an end time of the TCP session if the end time of the TCP session is recognized; calculating the connection time of the TCP session by subtracting the start time of the TCP session from an end time of a PPP connection if the end of the TCP session is not recognized but the end time of the PPP connection is recognized; and calculating the connection time of the TCP session by subtracting the start time of the TCP session from an end time of final transaction of the TCP session connection if the end time of the TCP session connection and the end time of the PPP connection are not recognized.

11. The method in claim 4, wherein the data service apparatus is one of the following: an interworking function (IWF), a packet data serving node (PDSN)), a serving GPRS supporting node (SGSN)), and a gateway GPRS supporting node (GPRS).

12. A billing apparatus for generating billing data for using mobile I data services, the apparatus comprising: a recognizing portion configured to recognize a transaction based on a packet data transceived between a data service apparatus and a proxy server, wherein the transaction is a pair of a HTTP request and a HTTP response corresponding to the HTTP request; a basic Internet protocol detail record (IPDR) generating portion configured to generate a basic IPDR per a transaction, wherein the basic IPDR comprises a start time and an end time of the transaction, an amount of packet data, and an access address; and a combined IPDR generating portion configured to generate a combined IPDR from aggregating a plurality of basic IPDRs, wherein the basic IPDRs, classified as a same service group, are combined together, wherein the combined IPDR generating portion comprises: a session manager configured to recognize an end of a TCP session; a checking portion configured to check if there is an end error in one of transactions based on the basic IPDR; an error correcting portion configured to redefine the start time or the end time of the transaction if there exists the end error; a transaction classifying portion configured to classify the basic IPDR into one of predetermined service groups based on the access address included in the basic IPDR; and a use time aggregating portion configured to generate the combined IPDR from aggregating the amount of service use time for service groups, wherein the aggregated amount of service use time is a sum of differences between the end time and the start time of transactions in each service group, wherein if the end error is either a first error in which an end of transaction is not recognized or a second error in which when plural transactions occur during one TCP session connection, the end time of preceding transaction occurs after the start time of following transaction, and wherein the error correcting portion sets the end time of the transaction to be the same as the start time of following transaction.

13. The billing apparatus in claim 12, further comprising an idle time calculating portion configured to generate an idle time by subtracting a total amount of service use time from a connection time of a TCP session.

14. A computer-readable medium including program containing computer-executable instructions for performing a method of generating a combined billing data for each of service groups at a billing apparatus, the method comprising:

(a) recognizing a transaction based on a packet data being transmitted between a data service apparatus and a proxy server, wherein the transaction is a pair of a hyper text transfer protocol (HTTP) request and a HTTP response corresponding to the HTTP request;

(b) generating a basic Internet protocol detail record (IPDR) per a transaction, wherein the basic IPDR comprises a start time and an end time of the transaction, an amount of packet data, and an access address;

repeating (a) and (b) until the end of a transmission control protocol (TCP) session between the user terminal and the proxy server;

generating a combined IPDR from aggregating a plurality of basic IPDRs, wherein the basic IPDRs, classified as a same service group, are combined together;

recognizing an end of the TCP session;

(c) checking an end error in one of transactions based on the basic IPDR;

(d) redefining the start time or the end time of the transaction if there exists the end error;

(e) classifying the basic IPDR into one of predetermined service groups based on the access address included in the basic IPDR;

repeating (c) to (e) for all basic IPDRs generated during the connection of TCP session; and generating the combined IPDR from aggregating the amount of service use time for each of service groups, wherein the aggregated amount of service use time is a sum of differences between the end time and the start time of transactions in each service group, wherein if the end error is either a first error in which an end of transaction is not recognized or a second error in which when plural transactions occur during one TCP session connection, the end time of preceding transaction occurs after the start time of following transaction, and wherein the error correcting portion sets the end time of the transaction to be the same as the start time of following transaction.

* * * * *